United States Patent [19]

Crawford et al.

[11] Patent Number: 5,000,056
[45] Date of Patent: Mar. 19, 1991

[54] INTERNAL DISC BRAKE FOR TRANSAXLE

[75] Inventors: Paul A. Crawford; James E. Hall, both of Mt. Vernon, Ohio

[73] Assignee: Dana Corporation, Toledo, Ohio

[21] Appl. No.: 386,516

[22] Filed: Jul. 27, 1989

[51] Int. Cl.⁵ .................. F16H 3/08; F16H 55/14; F16H 55/46

[52] U.S. Cl. ........................ 74/371; 188/72.7; 192/4 A

[58] Field of Search ............ 74/411.5, 368, 369, 74/371; 188/72.1, 72.7; 192/4 A, 6 A

[56] References Cited

U.S. PATENT DOCUMENTS

| | | | |
|---|---|---|---|
| 3,439,786 | 4/1969 | Schmid | 192/4 A |
| 3,485,329 | 12/1969 | Hauser | 192/4 A |
| 3,980,159 | 9/1976 | Baxendale | 188/72.7 |
| 4,036,329 | 7/1977 | Anderson | 188/72.7 |
| 4,182,435 | 1/1980 | Dadian | 188/72.7 |
| 4,633,979 | 1/1987 | Edwards | 188/72.7 |
| 4,676,345 | 6/1987 | Hillen et al. | 188/72.7 X |
| 4,736,820 | 4/1988 | Price et al. | 188/72.7 X |
| 4,809,560 | 3/1989 | Nemoto | 74/371 |
| 4,809,822 | 5/1989 | Margetts | 188/72.7 X |

Primary Examiner—Dwight Diehl
Assistant Examiner—Khoi Q. Ta
Attorney, Agent, or Firm—Allen D. Gutchess, Jr.

[57] ABSTRACT

A gear drive unit with an internal disc brake is disclosed. The brake disc is mounted for non-rotatable movement on a driven shaft in a housing of the drive unit. The housing has internal pockets for holding brake pucks at sides of the brake disc. An actuating member mounted in the housing moves one puck toward the disc when the member is rotated in a pre-selected direction. An adjustable spacer is located on the opposite side of the other brake puck and positions and backs up that puck adjacent the other side of the brake disc. The adjustment can be made outside the housing without the use of special tools. The internal brake has fewer parts, is easier to assemble, is not contaminated by dirt, leaves, and grass clippings, and the like, is not subject to damage, and does not present a possible source of injury to an operator or a child.

10 Claims, 2 Drawing Sheets

INTERNAL DISC BRAKE FOR TRANSAXLE

This invention relates to an internal disc brake particularly for use with smaller drive units in the nature of transmissions and transaxles for small vehicles.

Disc brakes for gear drive units as used on small vehicles, such as riding lawn mowers, snowmobiles, snowblowers, golf carts, garden tillers, and the like, have heretofore been known. Such brakes have been employed in connection with a driven shaft of the drive unit which extends outside the drive unit housing. The brakes include a brake disc mounted on the external portion of the shaft and mounted outside the housing thereof. Internal drum brakes for transaxles or transmissions have also been heretofore known in the art but take considerable space and are cumbersome.

The present invention provides an internal disc brake for use in a gear drive unit having a housing with a drive shaft. A brake disc is mounted with the housing on the shaft for rotational movement therewith and for limited longitudinal movement with respect thereto. The housing forms a first structurally-integral brake puck pocket or receptacle holding a first brake puck facing toward one surface of the brake disc. The housing also forms a second structurally-integral puck pocket or receptacle holding a second brake puck facing the other surface of the brake disc, in a position aligned with the first brake puck. The two pockets are formed by recesses in upper and lower parts of the housing, which recesses communicate with one another to form the complete pockets. The housing also forms a third pocket or chamber communicating with the first pocket and again formed by recesses which communicate with each other in the upper and the lower housing parts. A cam member is located in the third pocket and is engagable with the first brake puck on the side opposite the brake disc. The cam member has a shaft extending outside the housing where it is connected to a brake lever or the like for turning the shaft and the cam member to move the first brake puck toward the brake disc.

In a preferred form, the housing also forms a fourth pocket or chamber which is structurally-integral therewith, again being formed by recesses in the upper and lower housing parts which communicate with one another. An adjustable spacer is located in this fourth pocket and backs up the second brake puck on the side thereof opposite the brake disc. The spacer has an adjusting screw extending outside the housing so that an external adjustment can be made to the brake without removing the gear drive unit from the vehicle on which it is mounted and without the need for special tools.

By being internally located, the disc brake is removed from all environmental elements, including dirt, leaves, and grass clippings which can interfere with its operation. The internal brake also is not subject to damage and does not present a possible source of injury to an operator or a child.

The number of brake components is also reduced, which saves both manufacturing costs and assembly costs. Further, the actuator or cam member is designed so that it can be actuated by an external brake lever through either a push or a pull motion of the brake linkage.

It is, therefore, a principal object of the invention to provide a gear drive unit with an internal disc brake.

Many other objects and advantages of the invention will be apparent from the following detailed description of a preferred embodiment thereof, reference being made to the accompanying drawings, in which.

Figures 1, 3:
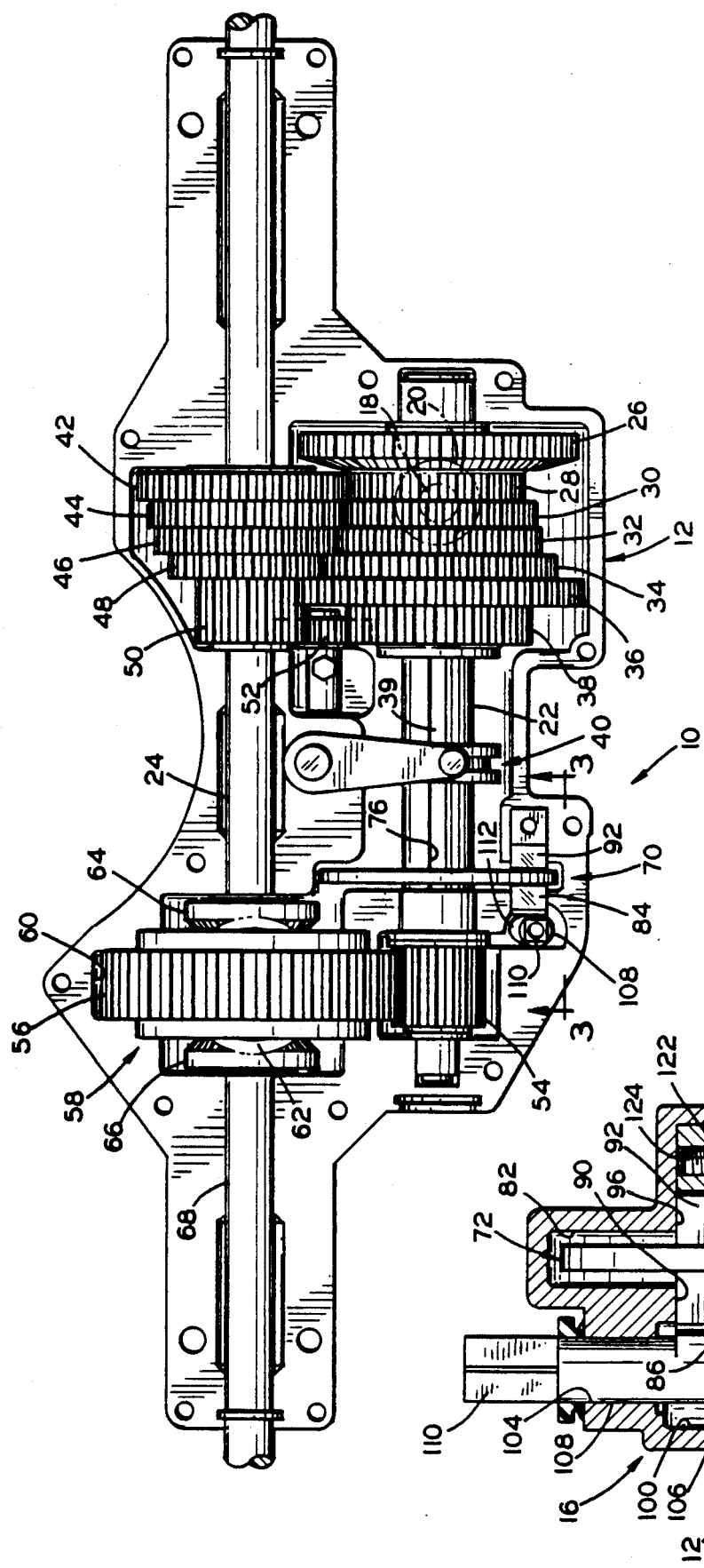
FIG. 1 is a somewhat schematic plan view of a transaxle having an internal disc brake in accordance with the invention, with an upper housing part removed.
FIG. 3 is an enlarged, fragmentary view in cross section taken along the line 3—3 of FIG. 1.
Figure 2:
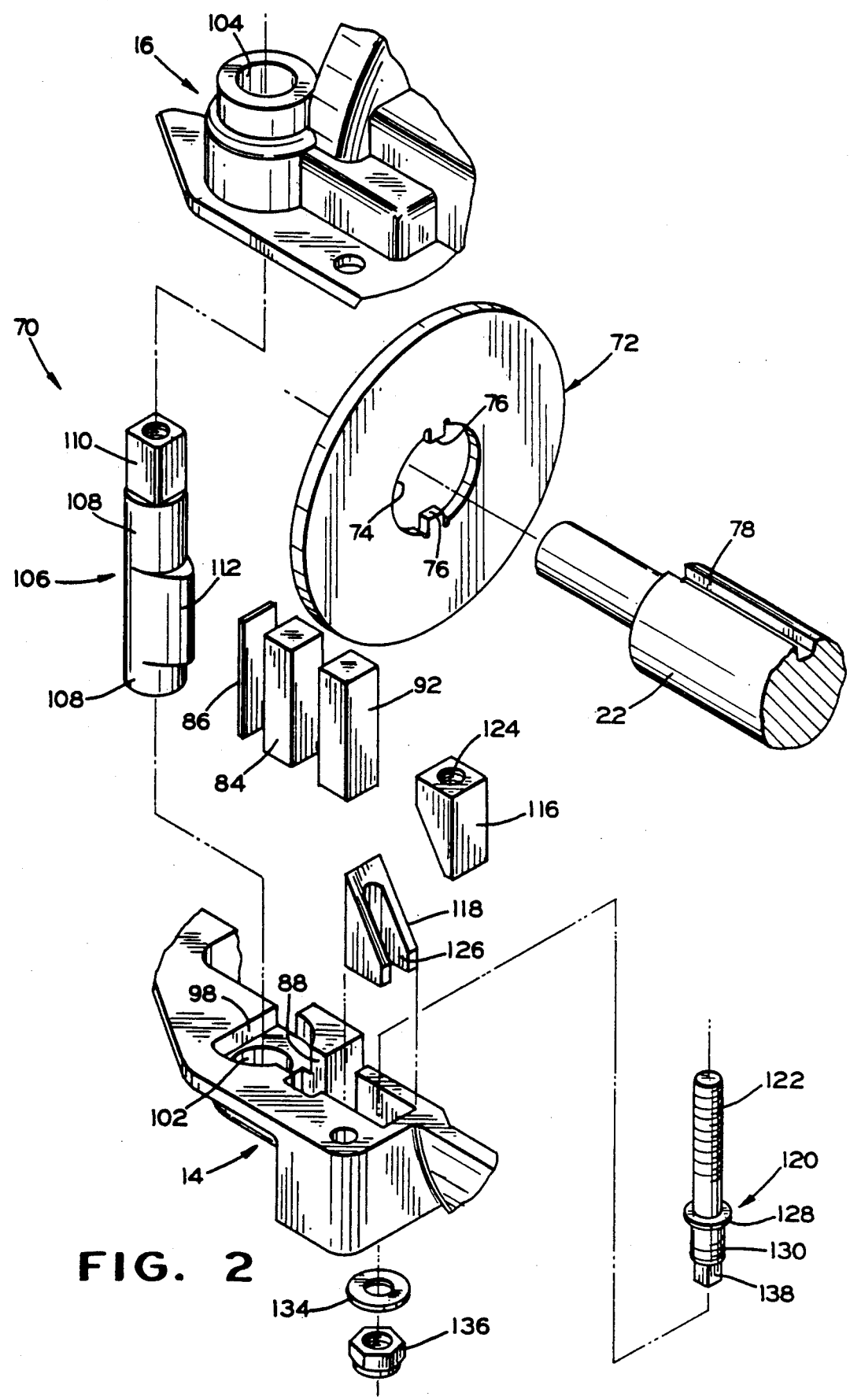
FIG. 2 is a fragmentary, enlarged, exploded view in perspective of the internal disc brake in accordance with the invention.

Referring to the drawings, a gear drive unit or transaxle 10 embodying the invention includes a housing 12 having a lower housing part or half 14 and an upper housing part or half 16, which is removed in FIG. 1, the two parts meeting along a mating line to form the complete housing. The transaxle has an input shaft 18 and a drive bevel gear 20, both being shown in dotted lines in FIG. 1. The input shaft extends through the upper part 16 of the housing 12 and can be driven by any suitable means, such as a pulley (not shown) affixed thereto and driven through a belt by a pulley mounted on an engine of a small vehicle with which the transaxle is used. The transaxle 10 also has a first or intermediate shaft 22 and a second or output shaft or axle 24.

A combination driven bevel gear 26 is rotatably supported on the shaft 24 and is driven by the drive bevel gear 20. A first, forward speed gear 28 is structurally integral and rotates with the driven bevel gear 26. Additional first, forward speed gears 30-36 are individually rotatably supported on the shaft 22 and are separate from one another. A first reverse gear 38 is located adjacent the forward speed gear 36 and is also rotatably supported on the shaft 22.

The first forward speed gears 28-36 are selectively individually rotated with the shaft 22 by a draw key 39 of shift mechanism generally indicated at 40. Similar shift mechanism is shown in U.S. Pat. No. 4,702,119, issued Oct. 27, 1987 and in a copending U.S. application of Douglas F. Edwards, entitled "Gear Drive Unit With Modifications", Ser. No. 386,515, filed Jul. 27, 1989. Therefore, the shift mechanism will not be discussed in detail, particularly since it does not form part of the instant invention.

Four second, forward speed gears 42-48 are rotatably supported by the output shaft or axle 24 and mesh, respectively, with the first forward speed gears 28-34. The four gears 42-48 are mounted for non-rotatable movement relative to one another by a splined shaft 50, the length of which substantially exceeds the combined width or thickness of the four gears 42-48. Portions of the splined shaft 50 engage the first forward speed gear 36 and also an idler gear 52 which meshes with first reverse gear 38 so that the splined shaft not only serves to rotate together the four second forward speed gears 42-48 but also serves as a fifth, second forward speed gear and a second reverse gear.

A drive pinion gear 54 is affixed to the intermediate shaft 22 and rotates therewith. The gear 54 drives a ring gear 56 of a differential 58 which is known in the art. The ring gear 56 rotates in a housing chamber 60 and carries diametrically opposite idler bevel gears 62. These mesh with a bevel gear 64 which is affixed to an end of the output shaft 24 and a bevel gear 66 which is affixed to an end of another output shaft 68.

In the operation of the transaxle, when the combination gear 26 is connected to the shaft 22 by the draw key 39 of the shift mechanism 40, the pinion drive gear 54 is driven directly through the shaft 22. The gear 54 thereby rotates the ring gear 56 and the output shafts 24 and 68 at one forward speed. When the first forward speed gear 30 is connected to the shaft 22, the drive is through the gear 28, the second forward speed gears 42 and 44 and back through the first gear 30 and the pinion gear 54 is driven at another forward speed. When the first forward speed gear 32 is connected to the shaft 22, an additional forward speed gear is attained through the gears 28, 42, 46, and 32. When the first forward speed gear 34 is connected to the shaft 22, the drive is then through the gears 28, 42, 48, and 34. When the first forward speed gear 36 is connected to the shaft 18, the drive is then through the gear 28, the gear 42, the splined shaft 50, and the gear 36. However, when the reverse gear 38 is connected to the shaft 22, the drive is through the gears 28, 42, the splined shaft 50, and through the idler 52 and the first reverse gear 38 to drive the shaft and the drive pinion gear 54 in the opposite direction.

An internal disc brake 70, in accordance with the invention, is located within the housing 12. A brake disc 72 is mounted on the intermediate shaft 22 for rotatable movement therewith and for limited axial movement with respect thereto. The brake disc 72 has a central opening or hole 74 with two tabs 76 which are diametrically opposite and extend radially inwardly. The tabs engage diametrically-opposite draw key grooves 78 in the shaft 22 to accomplish the desired connection. The grooves 78 are formed in the shaft 22 to receive the draw keys 39 so that the shaft 22 need not be additionally machined or require other manufacturing steps to receive the disc 72. The brake disc 72 extends into lower and upper recesses 80 and 82 (FIG. 3) and is completely enclosed by the housing 12. A first brake puck 84 including a backing plate 86 is located on one side of the brake disc 72. Lower and upper recesses 88 and 90 in the housing parts 14 and 16 form a pocket in which the first brake puck 84 is received and is guided thereby for movement toward and away from the brake disc 72. A second brake puck 92 is located on the other side of the brake disc 72. Lower and upper recesses 94 and 96 are formed in the lower and upper housing parts 14 and 16 and form a second brake puck pocket in which the second brake puck 92 is located and guided for limited movement toward and away from the brake disc 72.

Additional lower and upper recesses 98 and 100 are formed in the lower and upper housing parts 14 and 16 adjacent the recesses 88 and 90 and communicate therewith. The lower recess 98 has a blind hole 102 therein and the upper recess 100 has a through-hole or bore 104 therein. A cam member 106 has a cylindrical shaft 108, a lower end of which is received in the blind hole 102, and an upper portion of which extends through the upper bore 104 where it terminates in a noncircular end 110. The shaft 108 has an intermediate elliptical cam 112 formed thereon and located in the recesses 98 and 100. When the shaft 108 is turned in a clockwise direction, as viewed in FIG. 1, by a brake lever mounted on the noncircular end 110, the cam 112 moves the brake puck 84 toward the brake disc 72 through the backing plate 86. The brake lever mounted on the noncircular portion 110 of the cam member could also be turned one-hundred-eighty degrees to turn the cam member with a pull motion instead of a push motion, or vice versa. Further, the cam member 106 can be turned roughly one-hundred-eighty degrees in the recess 98 to again achieve a pull motion in place of a push motion or vice versa, for a given position of the shift lever on the noncircular portion 110.

The internal brake 70 preferably has adjustable backing means for initially positioning the brake disc and pucks and for making further adjustments because of wear of the brake pucks. One suitable adjustment is indicated at 114 and includes upper and lower wedge blocks 116 and 118. A threaded member 120 has an upper threaded shank 122 turned into a threaded bore 124 in the upper wedge block 116. A lower portion of the shank 122 also extends through a notch or opening 126 in the lower wedge block 118. The threaded member 120 has an integral circular flange 128 which is seated in the bottom of the lower recess 94. The member 120 further has a lower threaded shank 130 which extends through a bore 132 in the lower housing part 14 and extends below the housing 12. The shank 130 extends through a washer 134 and has a lock nut 136 threaded thereon. A noncircular end 138 of the member 120 projects below the nut 136 so that it can be turned by a wrench or can be provided with a slot so as to be turned by a screwdriver.

When the threaded member 120 is turned so as to move the shank 122 into the wedge block 116, that block is drawn downwardly to urge the lower block 118 toward the second brake puck 92. The threaded member is turned to a predetermined torque or tightened and backed off slightly at which time the nut 136 is tightened on the lower shank 130. The brake can be tightened from time-to-time as wear occurs in the brake pucks 84 and 92. The adjustment can be accomplished with a simple tool from below the transaxle without the need for removing the transaxle from the vehicle in which it is used or disassembling the housing.

From the above, it will be seen that the internal disc brake in accordance with the invention requires fewer parts or components, which reduces both manufacturing costs and assembly time. The brake is not contaminated by external dirt or debris, including grass clippings, leaves, and the like nor is it subject to possible damage as might occur if it were exposed externally. In addition, the internal brake does not present a possible source of injury to an operator or a child. The actuating mechanism of the internal brake also enables it to be operated in either a push or pull manner with a brake lever mounted in either of two positions, if desired. Further, the adjustment for the brake puck is easily accessible and adjusted by a simple tool and the gear drive unit need not be disassembled or removed from the vehicle for this purpose.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. In combination, a gear housing, a shaft in said housing having at least one gear mounted thereon, a brake disc rotatable with said shaft in said housing, said housing forming a first puck pocket, a first brake puck located in said first brake puck pocket on one side of said brake disc, said housing forming a second brake puck pocket, a second brake puck located in said second brake puck pocket on the other side of said brake disc, backing means engaged with said second brake puck and backing up said second brake puck in said second brake puck pocket, said backing means being adjustable and comprising threaded means extending outside said housing for adjusting said backing means, and actuating means carried by said housing and engagable with said first brake puck to move said first brake puck toward said brake disc.

2. In combination, a gear housing, a shaft in said housing having at least one gear mounted thereon, a brake disc rotatable with said shaft in said housing, said housing forming a first puck pocket, a first brake puck located in said first brake puck pocket on one side of said brake disc, said housing forming a second brake puck pocket, a second brake puck located in said second brake puck pocket on the other side of said brake disc, backing means engaged with said second brake puck and backing up said second brake puck in said second brake puck pocket, said backing means comprising two wedge blocks adjacent said second puck and having contiguous slanted surfaces, means for drawing said wedge blocks together to move one of said wedge blocks toward said second brake puck, and actuating means carried by said housing and engagable with said first brake puck to move said first brake puck toward said brake disc.

3. In combination, a gear housing, a shaft in said housing having at least one gear mounted thereon, a brake disc rotatable with said shaft in said housing, said housing forming a first puck pocket, a first brake puck located in said first brake puck pocket on one side of said brake disc, said housing forming a second brake puck pocket, a second brake puck located in said second brake puck pocket on the other side of said brake disc, backing means engaged with said second brake puck and backing up said second brake puck in said second brake puck pocket, and actuating means carried by said housing and engagable with said first brake puck to move said first brake puck toward said brake disc, said shaft having a longitudinally-extending groove and said brake disc having a central hole for receiving said shaft and having a radially-inwardly-extending tab extending into said groove whereby said brake disc can rotate with said shaft and can move in a direction axially of said shaft.

4. In combination, a gear housing, an input shaft rotatably mounted in said housing and having a drive gear therein, an intermediate shaft in said housing and having a driven gear engaged with said drive gear, at least one additional gear on said intermediate shaft, an output shaft in said housing parallel to said intermediate shaft, at least one second gear mounted on said output shaft and meshing with said additional gear, a brake disc mounted on said intermediate shaft in said housing for rotatable movement therewith and for movement in an axial direction with respect thereto, first friction means located in said housing on one side of said brake disc, second friction means located in said housing on the other side of said brake disc, actuating means at least partly in said housing and engagable with said first friction means to move said first friction means toward said brake disc, and additional means in said housing for engaging and backing up said second friction means, and including adjustable means for moving said second friction means toward said brake disc, said adjustable means comprising threaded means extending outside said housing for adjusting said additional means.

5. In combination, a gear housing, an input shaft rotatably mounted in said housing and having a drive gear therein, an intermediate shaft in said housing and having a driven gear engaged with said drive gear, at least one additional gear on said intermediate shaft, an output shaft in said housing parallel to said intermediate shaft, at least one second gear mounted on said output shaft and meshing with said additional gear, a brake disc mounted on said intermediate shaft in said housing for rotatable movement therewith and for movement in an axial direction with respect thereto, first friction means located in said housing on one side of said brake disc, second friction means located in said housing on the other side of said brake disc, actuating means at least partly in said housing and engagable with said first friction means to move said first friction means toward said brake disc, additional means in said housing for engaging and backing up said second friction means, said intermediate shaft having two diametrically-opposite, longitudinally-extending grooves therein, and said brake disc having a central hole which receives said intermediate shaft and has diametrically-opposite, radially-inwardly-extending tabs extending into said grooves.

6. The combination according to claim 3 wherein shift mechanism including a draw key is in said housing for selectively connecting said gear with said shaft, said draw key being guided for longitudinal movement relative to said shaft by said longitudinally-extending groove.

7. The combination according to claim 5 wherein shift mechanism is in said gear housing, said shift mechanism including draw keys for selectively connecting said driven gear and said at least one additional gear to said intermediate shaft, said draw keys being guided for movement by said longitudinally-extending grooves in said intermediate shaft.

8. In combination, a housing, said housing having an upper part and a lower part meeting along a mating line, a shaft in said housing at the mating line, a brake disc rotatable with said shaft, a first brake puck, said upper housing part having a first upper recess with an open lower end, said lower housing part having a first lower recess with an open upper end communicating with the lower end of said upper recess to form a first puck pocket, a second brake puck, said upper housing part having a second upper recess with a lower open end, said lower housing part having a second lower recess with an upper open end communicating with the lower open end of said second upper recess to form a second puck pocket, said first puck pocket positioning said first brake puck in a location facing toward one side of said brake disc, said second puck pocket positioning said second brake puck in a location facing toward the other side of said brake disc, adjustable means in said second brake pocket and backing up said second brake puck on the side opposite said brake disc, said adjustable means comprising threaded means extending outside said housing for adjusting said adjustable means, and actuating means carried by said housing and engagable with said first puck to move said first puck toward said brake disc.

9. In combination, a gear housing, an input shaft rotatably mounted in said housing and having a drive gear therein, an intermediate shaft in said housing and having a driven gear engaged with said drive gear, at least one additional gear on said intermediate shaft, an output shaft in said housing parallel to said intermediate shaft, at least one second gear mounted on said output shaft and meshing with said additional gear, a brake disc mounted on said intermediate shaft in said housing for rotatable movement therewith and for movement in an axial direction with respect thereto, first friction means located in said housing on one side of said brake disc, second friction means located in said housing on the other side of said brake disc, a cam shaft rotatably carried by said housing and having an axis which is parallel to said brake disc, said cam shaft having a cam engagable with a side of said first friction means opposite said brake disc to move said first friction means toward said brake disc, means extending outside of said housing for rotating said cam shaft to move said cam means, and additional means in said housing for engaging and backing up said second friction means, said additional means including adjustable means comprising threaded means extending outside said housing for moving said second friction means toward said brake disc.

10. The combination according to claim 6 wherein said adjustable means comprises at least one wedge block, and said threaded means said second friction means.

* * * * *

UNITED STATES PATENT AND TRADEMARK OFFICE
CERTIFICATE OF CORRECTION

PATENT NO. : 5,000,056
DATED : March 19, 1991
INVENTOR(S) : Paul A. Crawford and James E. Hall It is certified that error appears in the above-identified patent and that said Letters Patent is hereby corrected as shown below:

Column 8, line 9, claim 10, line 3, after "means" insert

--moves said wedge block toward from--.

Signed and Sealed this

Twenty-fourth Day of August, 1993

Attest:

BRUCE LEHMAN

Attesting Officer

Commissioner of Patents and Trademarks